US010065168B2

(12) United States Patent
Goldstein et al.

(10) Patent No.: US 10,065,168 B2
(45) Date of Patent: Sep. 4, 2018

(54) HIGH TEMPERATURE PRESSURE DIGESTION VESSEL SYSTEM WITH DUAL ACTION SEAL

(71) Applicant: CEM Corporation, Matthews, NC (US)

(72) Inventors: Ian Goldstein, Matthews, NC (US); Wyatt P. Hargett, III, Matthews, NC (US)

(73) Assignee: CEM Corporation, Matthews, NC (US)

( * ) Notice: Subject to any disclaimer, the term of this patent is extended or adjusted under 35 U.S.C. 154(b) by 0 days.

(21) Appl. No.: 15/447,250

(22) Filed: Mar. 2, 2017

(65) Prior Publication Data

US 2017/0312728 A1 Nov. 2, 2017

Related U.S. Application Data

(60) Provisional application No. 62/330,375, filed on May 2, 2016.

(51) Int. Cl.
*B01J 19/02* (2006.01)
*B01J 19/12* (2006.01)
*B01J 19/24* (2006.01)

(52) U.S. Cl.
CPC .............. *B01J 19/02* (2013.01); *B01J 19/126* (2013.01); *B01J 19/24* (2013.01);
(Continued)

(58) Field of Classification Search
CPC . B01J 19/02; B01J 19/126; B01J 19/24; B01J 2219/24; B01J 2219/00162;
(Continued)

(56) References Cited

U.S. PATENT DOCUMENTS 4,613,738 A 9/1986 Saville
4,736,083 A * 4/1988 Saville .................. B01J 19/126
219/686

(Continued)

FOREIGN PATENT DOCUMENTS

CN 202886173 4/2013
CN 103257069 8/2013
(Continued)

OTHER PUBLICATIONS

Pougnet et al., Computer Controlled Microwave Waveguide for Sample Heating and Dissolution; International Microwave Power Institute, 1991, pp. 139-144.
(Continued)

*Primary Examiner* — Ibrahime A Abraham
*Assistant Examiner* — Colleen M Raphael
(74) *Attorney, Agent, or Firm* — Parsons Summa

(57) ABSTRACT

A vessel system for high-pressure reactions is disclosed. The system includes a plugged polymer cylinder reaction vessel with a pressure vent opening extending radially through the wall of the reaction vessel and a supporting frame into which the vessel is received. Complementing keying structure elements on the vessel and on the frame limit the orientation of the reaction vessel in the supporting frame and the radially extending vent opening to a defined single position.

8 Claims, 9 Drawing Sheets

(52) U.S. Cl.
CPC ............ *B01J 2219/00141* (2013.01); *B01J 2219/00162* (2013.01); *B01J 2219/0295* (2013.01); *B01J 2219/1943* (2013.01); *B01J 2219/24* (2013.01)

(58) Field of Classification Search
CPC ........ B01J 2219/0295; B01J 2219/1943; B01J 2219/00141
USPC ................ 204/157.15, 157.43; 422/186–187
See application file for complete search history.

(56) References Cited

U.S. PATENT DOCUMENTS

| | | | |
|---|---|---|---|
| 4,882,128 A | | 11/1989 | Hukvari |
| 5,268,103 A | * | 12/1993 | Jameson ............ B01D 11/0203 422/256 |
| 5,270,010 A | | 12/1993 | Lautenschlager |
| 5,447,077 A | | 9/1995 | Lautenschlager |
| 5,948,307 A | | 9/1999 | Stalling |
| 6,136,276 A | | 10/2000 | Hargett |
| 6,258,329 B1 | * | 7/2001 | Mutterer, Jr. .......... B01J 19/126 204/157.15 |
| 6,531,140 B2 | | 3/2003 | Mammone |
| 8,795,608 B2 | | 8/2014 | Hargett |
| 2003/0127313 A1 | | 7/2003 | Lautenschlager |
| 2010/0206834 A1 | * | 8/2010 | Qian .................. B01L 3/50825 422/130 |
| 2011/0036705 A1 | | 2/2011 | Barclay |

FOREIGN PATENT DOCUMENTS

| | | |
|---|---|---|
| CN | 203291723 | 11/2013 |
| CN | 104056584 | 9/2014 |
| CN | 203881605 | 10/2014 |
| CN | 203990676 | 12/2014 |
| CN | 204666432 | 9/2015 |
| CN | 105107447 | 12/2015 |
| JP | 4158988 B | 6/2007 |

OTHER PUBLICATIONS

International Search Report of counterpart Patent Application No. PCT/US2017/030384 dated Aug. 14, 2017; 2 pgs.

* cited by examiner

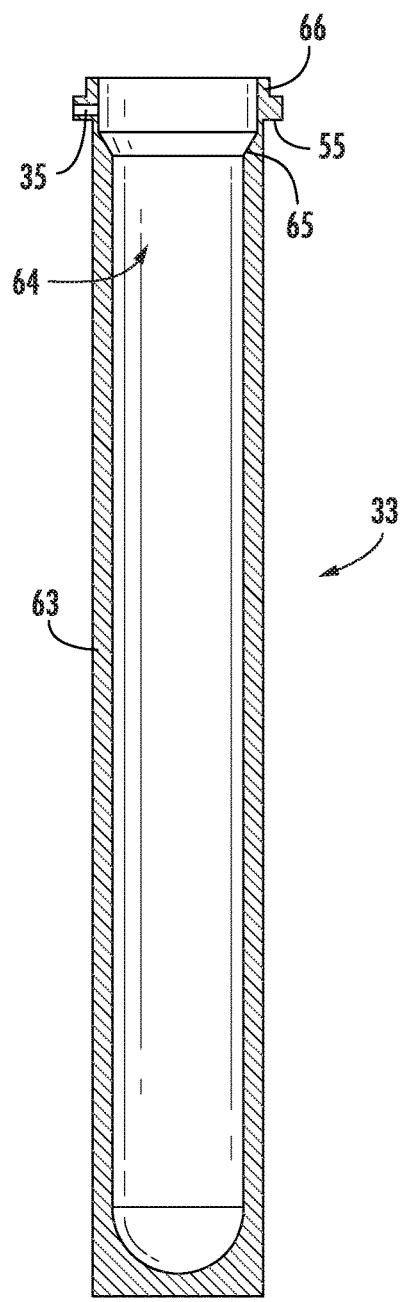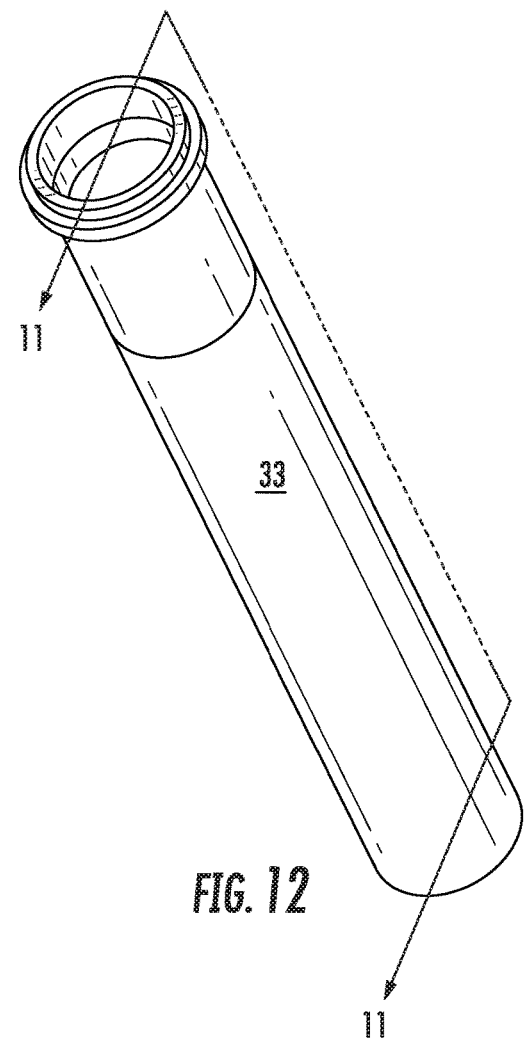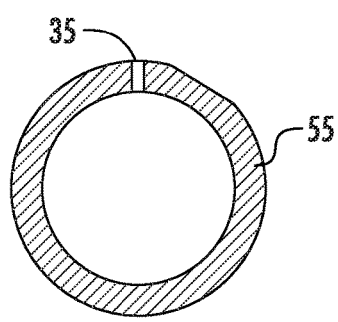
FIG. 11
FIG. 12
FIG. 13

HIGH TEMPERATURE PRESSURE DIGESTION VESSEL SYSTEM WITH DUAL ACTION SEAL

BACKGROUND

The present invention relates to vessel systems for high pressure chemistry and in particular relates to microwave assisted chemical analysis such as digestion in strong acids, or extraction in organic solvents.

The use of microwave radiation for acid digestion and solvent extraction is generally well established in the industry.

Digestion refers to several types of processes, including reducing materials to ash in a high temperature furnace. In the context of the invention, however, digestion is predominantly carried out by placing a matrix (rocks, plants, soil, food, pharmaceuticals, plastics, metals) in a strong mineral acid or a combination of several strong mineral acids (sulfuric, hydrochloric, phosphoric, nitric) and heating the resulting combination until the acids break down the matrix into elements or ions. At the end of digestion, the result is usually a clear or nearly colorless solution that can be diluted and then tested using one or more quantitative analysis methods.

Microwave assisted closed-vessel extraction reduces solvent usage significantly and in particular can be used to perform a number of extractions using amounts of solvent an order of magnitude smaller than that required for conventional Sierra extractions.

In the digestion context, the most significant advantage of a closed microwave system is the time savings it provides. Microwave digestions can be carried out in less than about an hour as compared to 5-12 (or more) hours for open digestions. Closed microwave systems also permit digestion to take place at temperatures above the boiling points of the acids, while open digestions are limited to the boiling points of the acids. Microwave digestion requires proportionally less acid than open digestions. When carried out properly, microwave digestion prevents loss of corrosive acid fumes and or a corresponding loss of volatile elements. Finally, microwave digestion eliminates the risk of contamination from external sources as compared to open digestion.

For certain purposes, individualized single sample testing is most helpful, but in many contexts, a batch system that will concurrently digest a plurality of similar matrices at the same time will be helpful and efficient. Current examples include, but are not limited to, the Mars 6™ instrument from CEM Corporation (Matthews N C, US; the assignee of this application).

In the batch context, efficiency can be increased by including more samples in each batch. Thus, currently available batch systems usually incorporate a turntable that will hold up to 12 digestion vessels concurrently. Typically, each vessel is maintained in some type of reinforcing structure to help maintain the vessels in a closed state while the microwave heating step directly drives the reaction to the temperature required to successfully carry out the digestion.

As some partial disadvantages or limitations, however, a number of such systems are limited to fairly small volumes, and many require connected controls to measure temperature and pressure and are limited to a maximum of 12 vessels at a time. The pressure release in most closed microwave vessel systems is usually carried out by opening the lid of the vessel, even if only slightly, and allowing the gases to escape.

Additionally, some of the mechanical systems used to maintain the vessels closed under a desired pressure (and in some cases to dynamically open at a certain pressure limit) require significant mechanical advantage, for example torquing to as much as 60 inch-pounds.

Based on that, a system that incorporates 12 vessels in a batch will require significant effort to close all of the vessels before the batch can be carried out.

Therefore, a need exists for instruments that include a larger number of vessels on the turntable for the batch, in which the vessels can hold at least about hundred milliliters or more, without any connected controls for temperature and pressure measurement, without any metal parts, and while more intentionally controlling the venting of the dynamic pressure seal.

SUMMARY

In one aspect the invention is a vessel system for high-pressure reactions that includes a plugged polymer cylinder reaction vessel with a pressure vent opening extending radially through the wall of the reaction vessel, and a supporting frame into which the vessel is received. Complementing keying structure elements on the vessel and on the frame limit the orientation of the reaction vessel in the supporting frame and the radially extending vent opening to a defined single position.

In another aspect the invention is a vessel system for high-pressure reactions that includes a polymer cylinder reaction vessel with a pressure vent opening extending radially through the wall of the reaction vessel. A cylindrical reinforcing sleeve surrounds portions of the reaction vessel other than the radially extending vent opening. A stepped sliding closure plug is in the mouth of the reaction vessel for opening and closing the radially extending pressure vent opening without opening the mouth of the reaction vessel. A dimensionally stable closure is on the closure plug. The vessel is received in a supporting frame with a clamp for securing the vessel in the frame by exerting force against the dimensionally stable closure. Complementing keying structure elements on the vessel and on the frame limit the orientation of the reaction vessel and the radially extending vent opening to a defined single position.

In another aspect the invention is a method of carrying out high-pressure reactions that includes the steps of heating reactants in a reaction vessel that is closed with a sliding plug, and releasing gases from the reaction vessel by sliding the plug to open a radially extending vent opening in the reaction vessel, but without removing the sliding plug from the vessel or otherwise opening the vessel.

The foregoing and other objects and advantages of the invention and the manner in which the same are accomplished will become clearer based on the followed detailed description taken in conjunction with the accompanying drawings.

BRIEF DESCRIPTION OF THE DRAWINGS

FIG. 11 is a cross-sectional view of the reaction vessel.

FIG. 12 is a perspective view of the reaction vessel.

FIG. 13 is a cross-sectional view of the vessel taken along lines 13-13 of FIG. 12.

DETAILED DESCRIPTION

Figure 1:
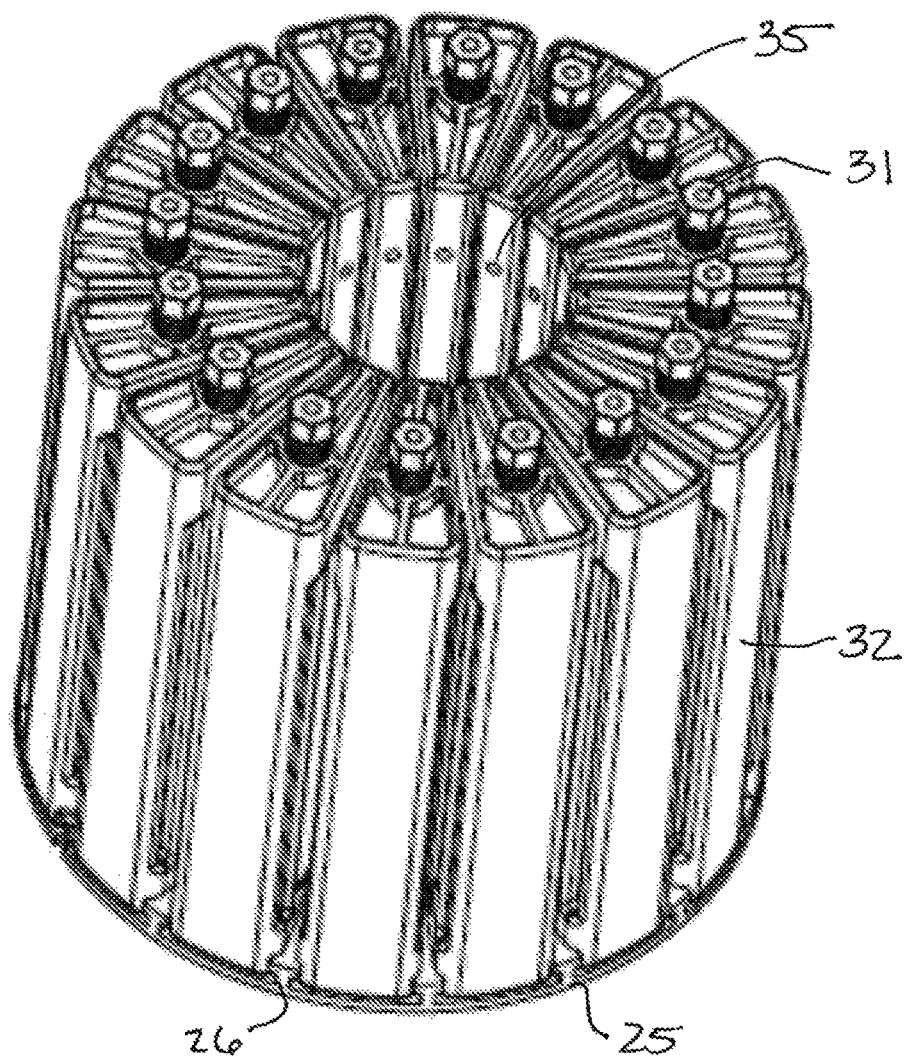
FIG. 1 is a perspective view of a vessel array that incorporates the reaction pressure vessels and supporting frames of the invention.

The invention is the combination of a vented polymer (PTFE is exemplary) reaction vessel, a surrounding composite sleeve, a closure plug, a closure cap on the closure plug, and a surrounding supporting frame into which the reaction vessel is received.

The invention provides advantages over existing vessel systems (e.g., U.S. Pat. Nos. 8,795,608 and 6,136,276 respectively). As one improvement vessels, the invention provides a more robust vessel system that can withstand higher temperatures and pressures, including temperatures and pressures required for difficult digestion matrices.

As another improvement, the invention offers a more secure closure with a better venting system combined with a narrower profile (i.e., more vessels in the microwave instrument at the same time).

The PTFE vessel is closed with a molded or cast PTFE plug that has three identifiable sections. The lowest section has a circumferential taper to match the circumferential taper near (but not at) the top of the PTFE reaction vessel. A middle cylindrical segment of the plug is above (in the usual orientation) the tapered section, and a wider cylindrical top section is above the middle segment.

The relationship between the polymer vessel and the composite sleeve is such that the sleeve extends along the side of the vessel to at least include the tapered portions of the vessel interior that meet the tapered portions of the solid plug. In previous vessels, the composite sleeve never reaches (axially) the sealing portion of the structure.

The dimensionally stable cap covers both the solid plug and the upper rim of the reaction vessel. At an excess pressure, the plug will move axially in the vessel creating a small gap between the tapered and middle sections of the plug and the vessel walls. This pressure-induced gap creates a connection with a laterally extending pressure release opening in the vessel. Because the plug is stepped, however, the upper portions of the plug remain in constant contact with the upper rim of the reaction vessel. The structure keeps the remainder of the vessel sealed while venting takes place through the intended pressure release opening.

The dimensionally stable cap is in the shape of an inverted "U", and the legs meet the upper rim of the polymer reaction vessel to prevent circumferential expansion of the reaction vessel during gas release.

The vessel, the closure elements, and the composite sleeve are used in conjunction with a frame that includes a vertically oriented bolt that is threaded and can be turned to exert force against the dimensionally stable cap.

Because the taper of the plug is shallow, a smaller torque can be applied to the cap to obtain a satisfactory closure. For example, in the invention, the frame bolt can be hand torqued to about 15 inch-pounds. By comparison, in some current vessels, the bolt must be torqued, typically in a bench holder, to about 60 inch-pounds. Avoiding a bench torqueing step gives the invention corresponding time and efficiency advantages, particularly for laboratories carrying out many digestion tests on a repeated basis.

As another advantage, the vessel system and the frame are keyed or clocked so that the vessel and closure can only be inserted into the frame in a single defined position, which in turn defines the position of the gas opening. This in turn allows a corresponding gas (vent) opening to be positioned in the frame so that exiting gases can be directed as desired. In most cases the gas opening will be directed "inwardly;" i.e., towards the center of the usual turntable arrangement of vessels.

The closure system can be formed entirely of microwave transparent and acid resistant materials (by way of comparison, some current vessels incorporate a metal ring for some of the circumferential sealing). Finally the overall frame is taller and narrower, than many corresponding vessels and frames allowing for 16 vessel and frame combinations on the same turntable that holds (for example) 12 more conventional vessels and frames.

FIG. 1 is a perspective view of a vessel array broadly designated at 30 of the type used in conjunction with a turntable type microwave instrument such as (but not limited to) the CEM MARS6™ instrument. As FIG. 1 illustrates, the invention provides for at least about 16 vessel and frame combinations on a turntable 25. As compared to the typical 12 vessel arrangement, this represents an increase of at least about one third, thus leading to significant efficiencies for frequent users.

The reaction vessels per se are not illustrated in FIG. 1, but the control bolt 31 that carries out the clamping function is visible for each supporting frame 32. FIG. 1 also illustrates that the turntable 25 carries a plurality of T-shaped ribs 26 that engage the turntable notch 42 (FIG. 2) on each frame to position and secure the frames 32 on the turntable 25.

Figure 2:
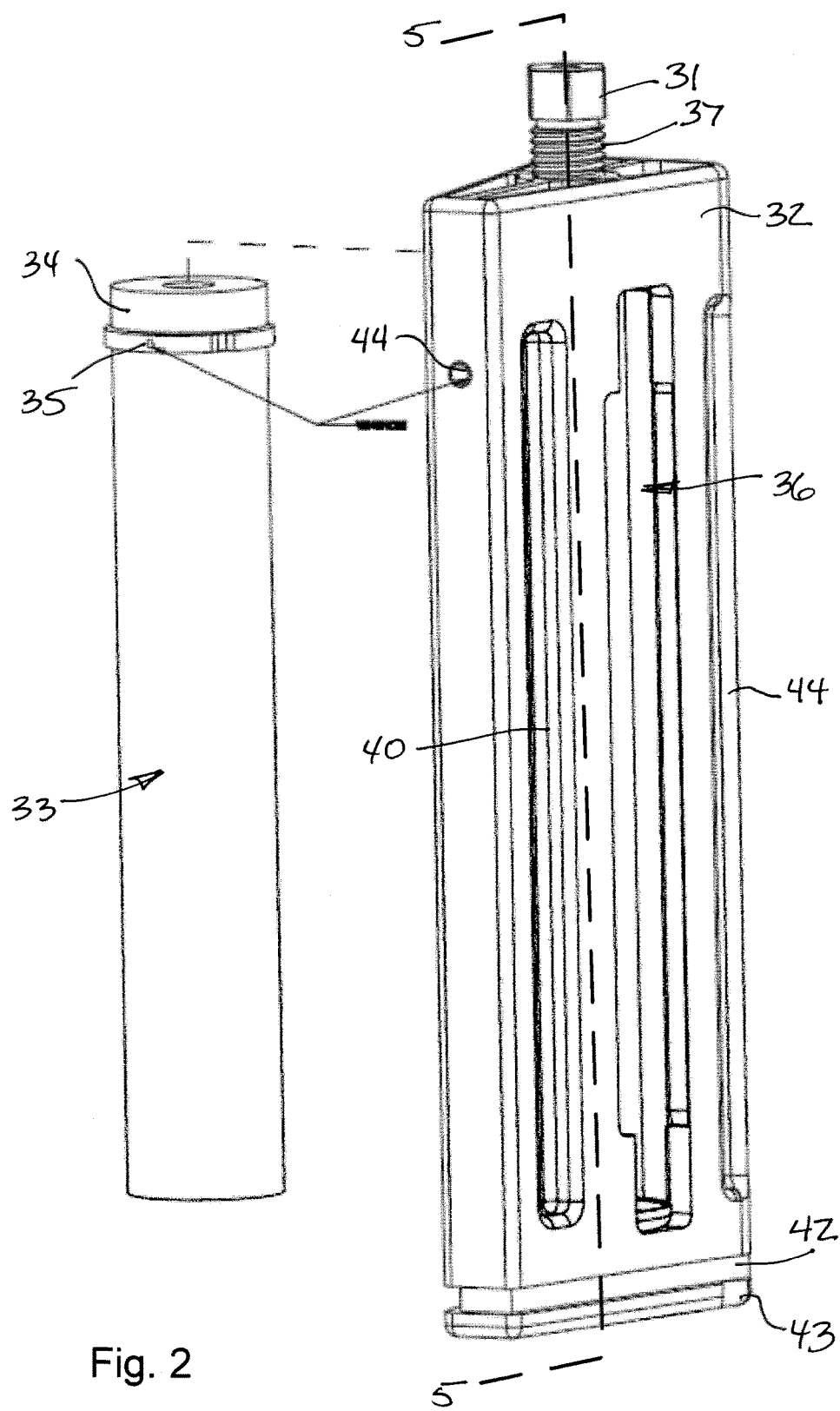
FIG. 2 is a perspective view of a reaction vessel and a supporting frame.

FIG. 2 is a perspective view of the frame and of the exterior of the plugged polymer cylinder reaction vessel broadly designated at 33. FIG. 2 illustrates the dimensionally stable closure illustrated as the cap 34. The vessel vent opening, which is illustrated in further detail in FIGS. 5 and 19, is illustrated at 35.

Figure 5:
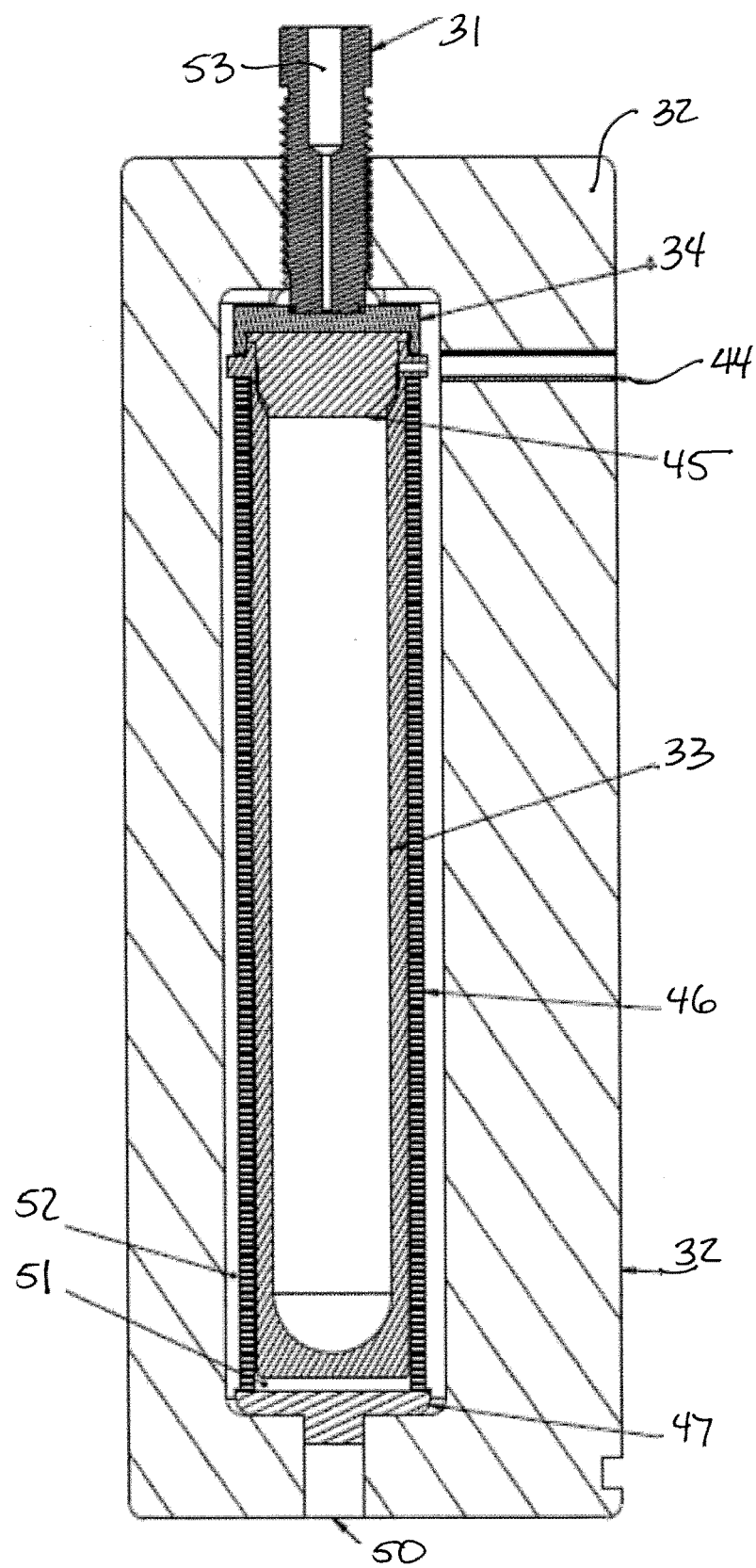
FIG. 5 is a cross-sectional view taken along lines 5-5 of FIG. 2.
Figure 19:
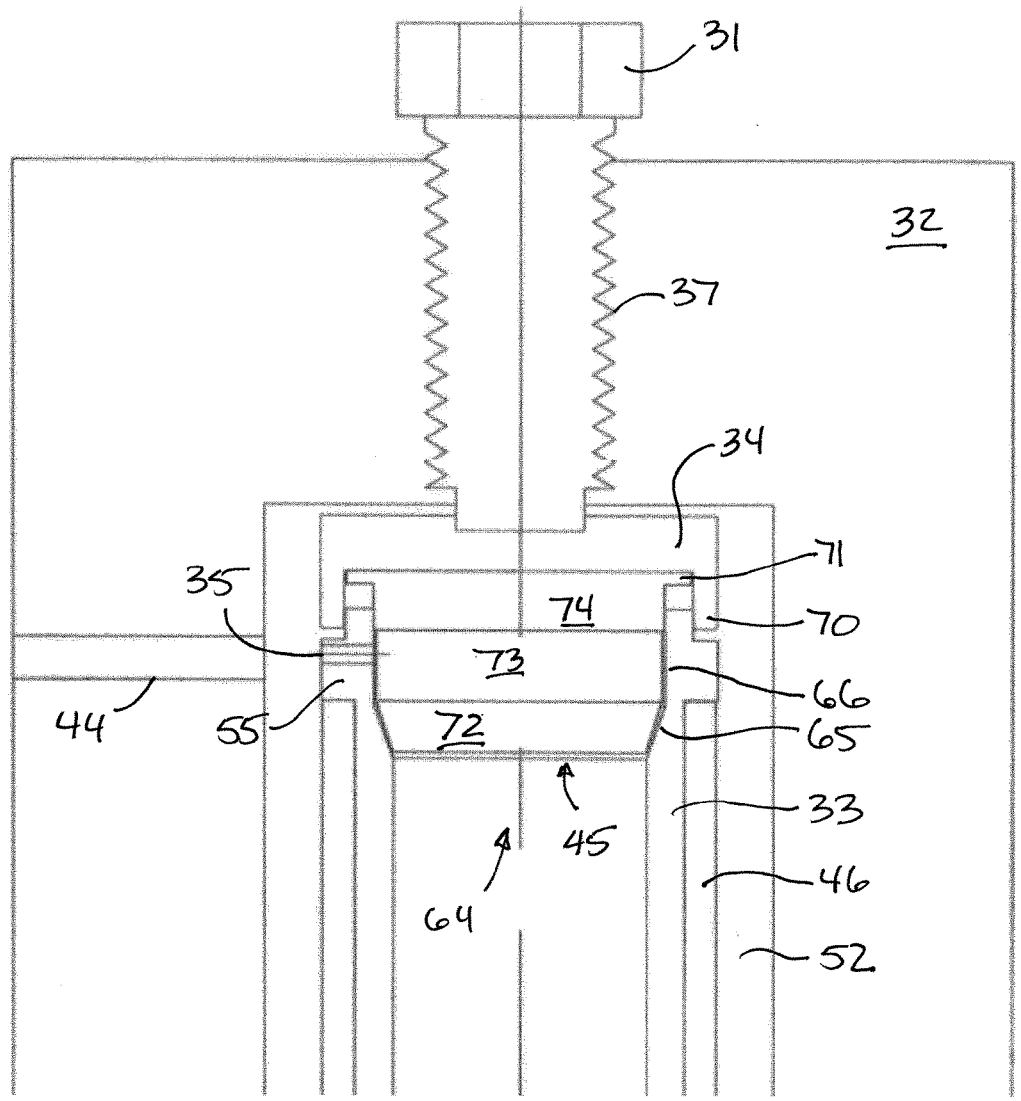
FIG. 19 is an enlarged view corresponding generally to the cross-sectional view of FIG. 5.

The supporting frame 32 includes a frame vent tube 44 the operation of which complements that of the vessel 33, and in a manner better illustrated in FIGS. 5 and 19.

The frame 32 defines a vessel chamber 36 into which the reaction vessel 33 is received. The control bolt 31 (shown with its threads 37) acts as a clamp when tightened against the dimensionally stable cap 34 to provide a closure force that keeps the reaction vessel closed at the elevated pressures generated during the heating step.

As further details, the frame can be formed as a partially grooved workpiece in order to save both weight and material, and provided that the remainder of the frame is maintained strong enough for the intended purpose.

FIG. 2 also illustrates that if desired, the frame 32 can be formed with a notch 42 or equivalent structure that makes it simpler or easier to align the frame 32 on a given turntable. A frame pedestal 43 forms the base of the frame.

Figure 3:
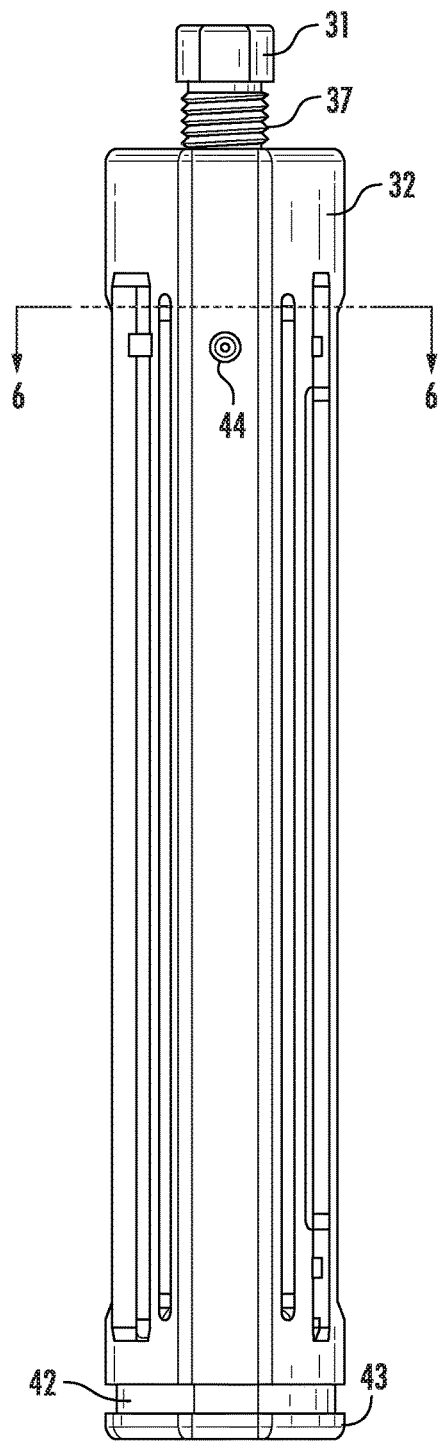
FIGS. 3 and 4 are respective side elevation views taken from opposite sides of the supporting frame.
Figure 4:
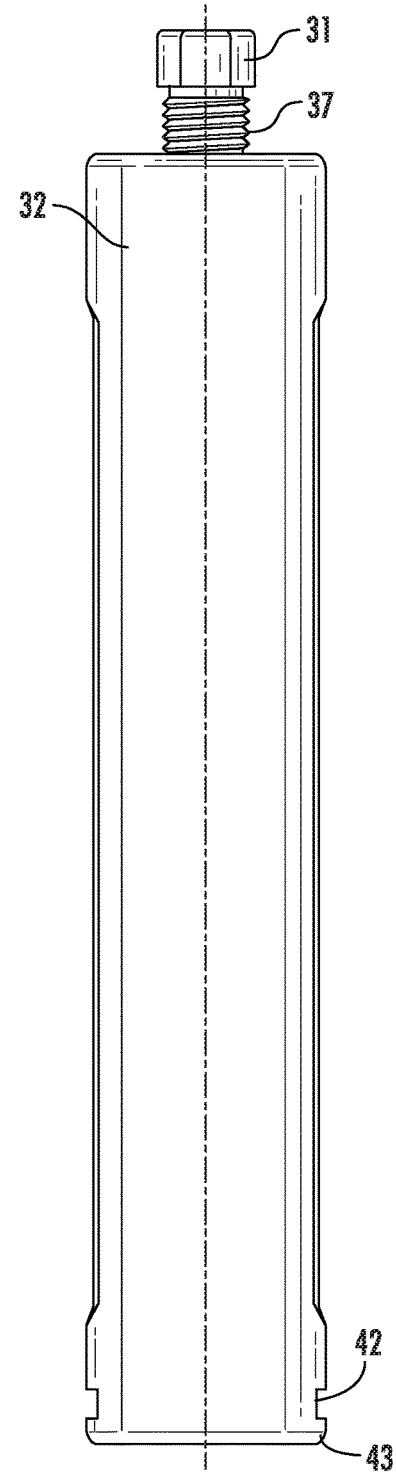

FIGS. 3 and 4 are respective opposing side elevational views of the supporting frame 32. These figures illustrate many of the same items as FIG. 2 including the clamping control bolt 31 and its threads 37, the vent frame tube 44, the turntable notch 42 and the frame pedestal 43.

FIG. 5 is a cross-sectional view taken along lines 5-5 of FIG. 2 and illustrates a number of additional items. Consistent with FIGS. 1-4, FIG. 5 illustrates the control bolt 31, the frame 32, the dimensionally stable cap 34 the frame vent tube 44, and the reaction vessel 33.

FIG. 5 also illustrates the stepped sliding closure plug 45 which rests in the mouth of the reaction vessel 33. The control bolt 31 can be turned to bear against the dimensionally stable cap 34 to any greater or lesser extent to maintain the plug in a seated position in the reaction vessel until the pressure inside the reaction vessel 33 exceeds the force applied by the bolt 31 and the supporting frame 32. A description of the structure of the stepped sliding closure plug 45 and its operation with respect to the other elements is given in more detail with respect to FIGS. 17, 18 and 19.

In the illustrated embodiment, and as is common in many circumstances, the reaction vessel 33 is surrounded by a sleeve 46. The combination offers a number of advantages. The reaction vessel 33 is formed of a polymer that is inert to the strong mineral acids used in digestion or the various organic solvents used in extraction. Fluoropolymers are exemplary for this purpose with polytetrafluoroethylene (e.g., Teflon®) being particularly advantageous. PTFE-type materials are flexible at high pressures, however, and the sleeve 46 helps maintain the radial dimensional stability of the reaction vessel 33 during high temperature, high pressure reactions.

For purposes of both strength and where necessary flexibility, the sleeve is a composite structure formed of one or more layers of woven engineering fiber and one or more appropriate polymers. The sleeve described in U.S. Pat. No. 6,534,140 is exemplary, but not limiting. In the microwave assisted context, such materials also remain transparent to microwave radiation.

To maintain axial stability while the vessel and sleeve are in the frame 32, a PTFE seat 47 is positioned at the opposite end of the reaction vessel from the control bolt 31 and the closure 34, and is further seated in a signal transmission opening 50 which also serves to allow (for example) infrared temperature measurement of the vessel 33 during a reaction.

The vessel and sleeve are sized to leave a small bottom gap 51 to allow the reaction vessel 33 to expand slightly along its axis, and a radial gap 52 is maintained between the vessel sleeve 46 and the vessel frame 32 to provide for some additional cooling.

FIG. 5 also illustrates a version of the control bolt 31 that has an optional axial bore 53 that is used in some circumstances to provide non-invasive measurement of (e.g.) temperature or pressure.

Figure 6:
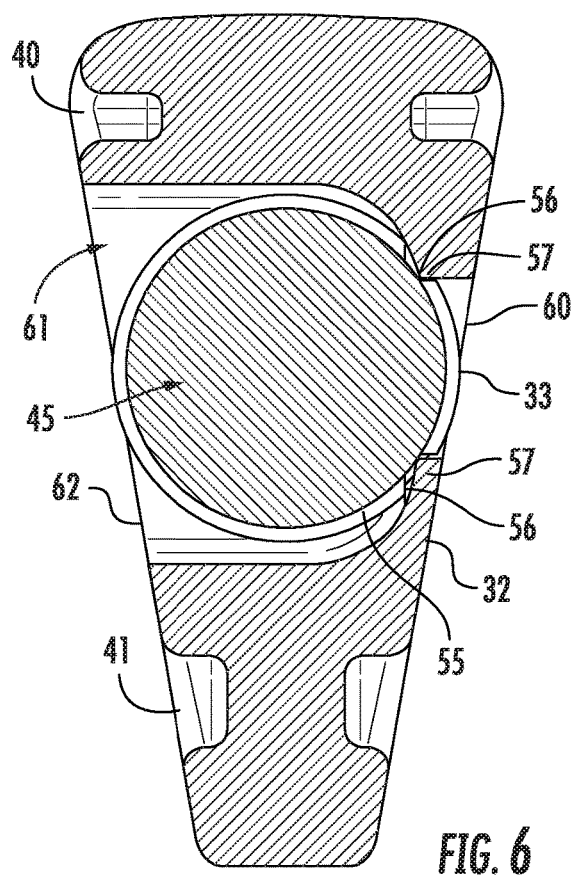
FIG. 6 is a cross-sectional view taken along lines 6-6 of FIG. 5.
Figure 7:
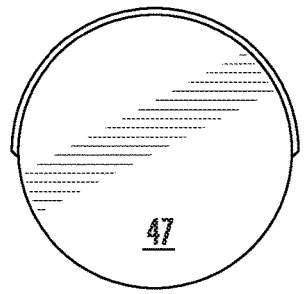
FIGS. 7-10 are respective plan, perspective, and cross-sectional views of the seat of the frame.
Figure 8:
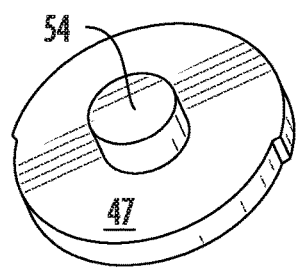
Figure 9:
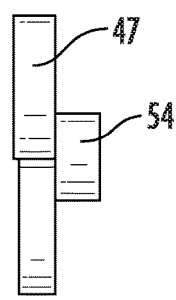
Figure 10:
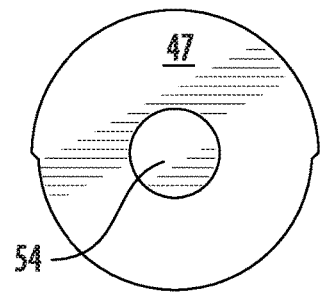

FIG. 6 is a cross-sectional view taken generally along lines 6-6 of FIG. 3. FIG. 6 illustrates the frame 32 and upper portions of the reaction vessel 33. In particular, FIG. 6 illustrates an outer ring 55 on the vessel through which the vessel vent opening 35 passes in the illustrated embodiments (e.g., FIG. 2). The outer ring 55 includes at least one (two are illustrated) keyed portions illustrated as the notches 56 that meet defined corners 57 in the smaller rectangular opening 60 in the frame 32. These complementing keying structural elements on the vessel and the frame limit the orientation of the reaction vessel 33 in the frame 32 and in turn align the radially extending vent opening 35 to a single defined position.

The directional control of the venting also helps increase the overall safety of the system, and helps protect an operator by limiting vent fumes to an intended defined direction.

FIG. 6 also helps illustrate the vessel chamber 61 in the frame 32 and the larger rectangular opening 62 into which the vessel 33 can be inserted to seat in the vessel chamber. The structural grooves 40 and 41 in the frame 32 are likewise illustrated.

FIGS. 7-10 illustrate the PTFE seat 47 and its seat finger 54 which positions the seat 47 in the signal transmission opening 50 in the frame 32. In the illustrated embodiment, the seat 47 also has a physical design that limits its orientation in the frame, but this is optional rather than mandatory, and in other embodiments, the seat 47 is entirely circular (i.e., a single diameter).

FIG. 11 is a cross-sectional view of the reaction vessel 33 taken generally along the lines 11-11 of FIG. 12. In particular, FIG. 11 helps illustrate that the vessel has a reaction cylinder segment 63 that makes up the majority of the axial dimension of the vessel 33. At the vessel mouth 64, the vessel defines several additional structural elements. Axially, the next element is a tapered segment 65 that in turn opens to a mouth cylinder segment 66. The outer ring 55 includes the vessel pressure vent opening 35.

FIG. 13 is a cross-sectional view of the outer ring 55 carrying the vent opening 35, and illustrating a second embodiment of the key structure for orienting the vessel 33 in a single position in the frame 32.

Figure 14:
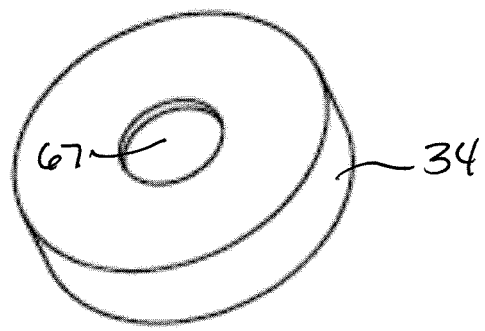
FIGS. 14, 15 and 16 are respective perspective, top plan, and cross-sectional views of the dimensionally stable closure.
Figure 15:
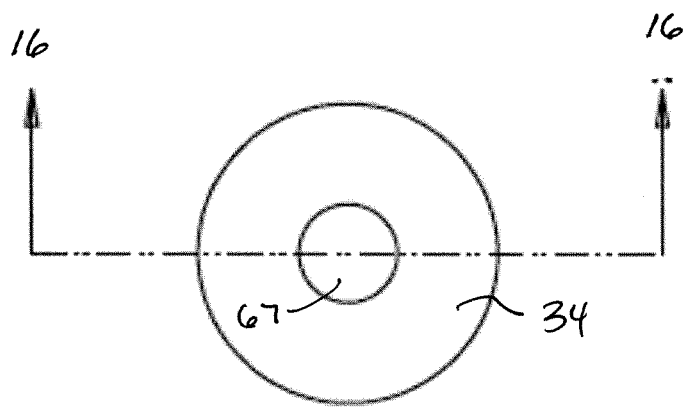
Figure 16:
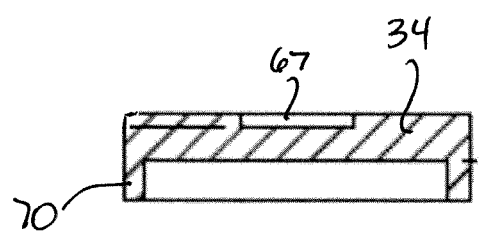

FIGS. 14, 15 and 16 are respective perspective, top plan, and cross-sectional views of the dimensionally stable cap 34. These three figures also illustrate that the closure 34 includes a seat 67 for receiving the control bolt 31. The closure cap 34 also includes a depending annular ring 70 that engages the mouth cylinder segment 66 of the reaction vessel 33 and the lid section 71 of the stepped sliding closure plug 45.

As used in this context, the term "dimensionally stable" means that the cap 34 is formed of a material that will not flex, expand, or contract under the normally expected temperatures, pressures and resulting forces generated inside the reaction vessel 33 during high-temperature digestion or extraction.

A current embodiment is formed of polyether imide (PEI) of which ULTEM™ is a widely recognized commercial variant. In exemplary embodiments the closure is molded or cast around glass to increase its dimensional stability.

Related engineering polymers include polyether ether keytone (PEEK) that likewise has excellent mechanical and chemical resistance properties at high temperatures. Persons skilled in this art will be able to select one of these or other engineering polymers without undue experimentation.

Figure 17:
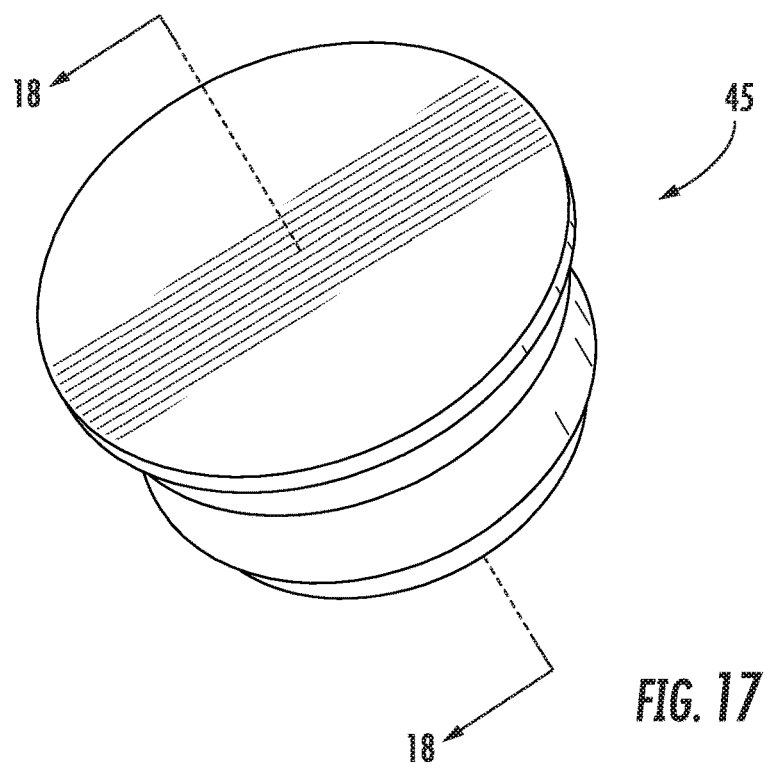
FIGS. 17 and 18 are respective perspective and cross-sectional views of the stepped sliding closure plug.
Figure 18:
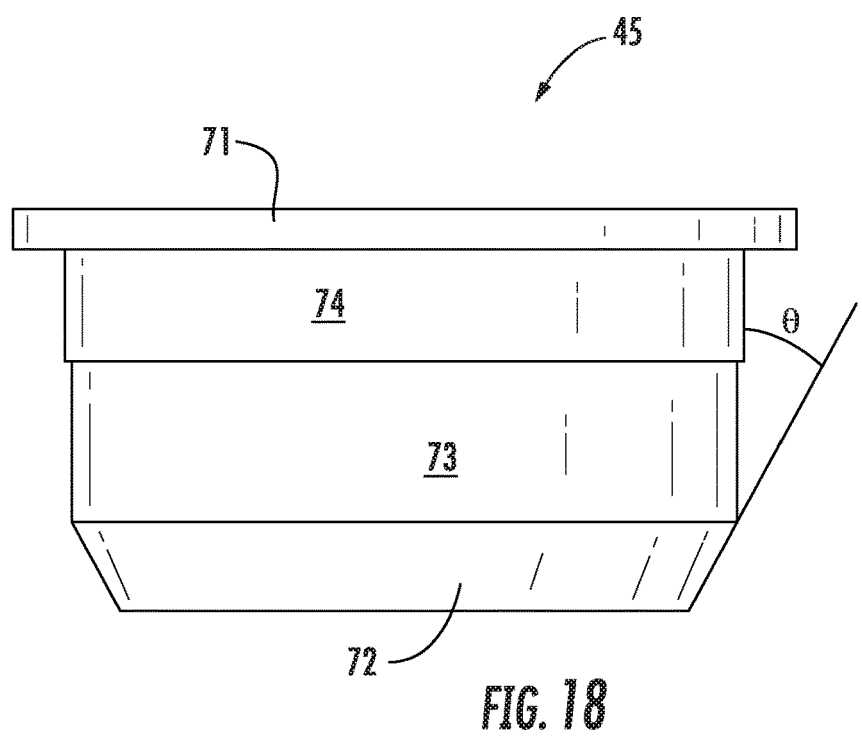

FIGS. 17 and 18 illustrate the stepped sliding closure plug 45 in more detail. In particular, the plug 45 is formed of PTFE or equivalent material with a circumferential tapered portion or segment 72 that engages the tapered section 65 of the vessel mouth 64. A first cylindrical segment 73 has a diameter that is slightly smaller than the diameter of the mouth cylinder segment 66 of the vessel 33. A vessel matching section or segment 74 is on the first cylindrical section 73 and has a diameter that engages the diameter of the wider mouth cylinder 66 of the reaction vessel 33. A lid segment 71 is wide enough to rest on the top edges of the vessel 33 and maintain the plug 45 at the top of the vessel 33.

In some embodiments, the angle of the tapered portion 72 on the plug 45 differs slightly from the angle of the tapered section 65 at the mouth 64 of the reaction vessel 33; e.g., by about 2°. This encourages the lowermost part of the tapered portion 72 to be the first portion to engage the mouth 64 of the reaction vessel 33. In turn, this reduces the unit force required to create a seal as compared to identical tapered angles.

The annular ring 70 on the dimensionally stable cap 34 prevents radial expansion of the entire closure at the top of the vessel 33.

The relatively shallow taper of the mouth segment 65, designated as theta (Θ) in FIG. 18, is less than 45° and in some cases than 30° or less taken axially. The shallow taper, combined with the presence of the composite sleeve 46 that provides radial support adjacent the tapered mouth segment 65 seats the plug 45 with a more moderate force as compared to conventional frame and vessel systems. This in turn allows the control bolt 31 to be tightened more easily and thus more quickly leading to greater efficiency in multiple batch processes.

The shallow taper or bite of the vessel 33 and plug 45 provide a further potential advantage in certain digestions. As the skilled person recognizes, when the matrix contains a number of different materials (i.e., is heterogeneous), some of those materials will digest at lower temperatures than others; indeed, some will start digesting in strong mineral acids at room temperature. Accordingly, some of these materials will provide an early release of significant amounts of volatile materials, frequently carbon dioxide and water vapor. In these circumstances, the pressure inside the vessel 33 can reach the matching pressure of the bolt 31 and frame 32 against the plug 45 at a relatively low temperature and before the remainder of the matrix digests. At that point, the plug 45 will move slightly in an axial direction to permit an early pressure release, but will return quickly to its seated position so that the reaction in the vessel 33 continues to the higher temperatures required to obtain a full digestion of the more difficult portions of such matrices.

FIG. 19 is an enlarged cross-sectional view corresponding to the top portions of FIG. 5. In particular, FIG. 19 shows the dynamic nature of the pressure release of the invention and is essentially a snapshot of the vessel system in a pressure-release orientation.

FIG. 19 represents the state in which the pressure in the reaction vessel 33 has urged the plug 45 upwardly against the dimensionally stable cap 34. This disengages the vessel matching section from its seated position adjacent the vessel vent opening and moves it axially so that the first cylindrical section 33—which has a diameter slightly smaller than the interface of the mouth cylinder segment 66 of the vessel 33—is adjacent the vessel vent opening 35 and the circumferential tapered portion of the plug 45 is slightly unseated from the tapered mouth segment 65 of the vessel 33.

This slight disengagement is sufficient to allow gases to escape from the interior of the reaction vessel 33 past the circumferential tapered portion and first cylindrical section 73 of the plug 45 and then through the vessel vent opening 35. As illustrated and exemplary, the frame vent tube 44 is oriented and aligned with the vessel vent opening 35 so that the vented gases travel immediately through the frame vent tube; i.e. at an intended position and in an intended direction. This alignment is, of course, a result of the key elements described with respect to FIG. 6.

During the escape of gases, however, the vessel matching section 74 remains entirely engaged to upper portions of the mouth cylinder segment 66 of the vessel 33 so that the vessel remains otherwise closed at its mouth. When sufficient gas has been released to reduce the pressure inside the vessel to equilibrate with the force applied by the control bolt 31, the bolt 31 and the dimensionally stable cap 34 urges and slides the plug 45 back into a fully seated position that prevents gases from escaping.

FIG. 19 also illustrates that the outer ring 55 serves the second purpose of axially positioning the composite sleeve 46 in relation to the reaction vessel 33.

In a method context, the invention includes the steps of heating reactants in a reaction vessel that is closed with a sliding plug, and then releasing gases from the reaction vessel by sliding the plug to open a radially extending vent opening in the reaction vessel, but without removing the sliding plug from the vessel or otherwise opening the vessel.

In exemplary embodiments, the method includes heating reactions inside the vessel using microwave radiation in a microwave transparent polymer vessel, and exerting a defined force against the sliding plug to preclude the plug from sliding until the gas pressure in the vessel exceeds the defined force being applied.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A vessel system for high-pressure reactions comprising:
   a polymer cylinder reaction vessel with a pressure vent opening extending radially through the wall of said reaction vessel;
   the inner face of said reaction vessel wall including a reaction cylinder segment, a mouth cylinder segment wider then said reaction cylinder segment, and a tapered segment that extends between said reaction cylinder segment and said mouth cylinder segment;
   a cylindrical reinforcing sleeve surrounding portions of said reaction vessel other than said radially extending vent opening;
   a stepped sliding closure plug in said mouth cylinder segment of said reaction vessel for opening and closing said radially extending pressure vent opening without opening the mouth of said reaction vessel;
   a dimensionally stable closure on said closure plug;
   a supporting frame into which said vessel is received;
   a clamp for securing said vessel in said frame by exerting force against said dimensionally stable closure; and
   complementing keying structure elements on said vessel and on said frame to limit the orientation of said reaction vessel and said radially extending vent opening to a defined single position.

2. A vessel system according to claim 1 wherein said radially extending vent opening extends through said wider mouth cylinder segment.

3. A vessel system according to claim 2 wherein said stepped plug comprises:
   a tapered portion that matches the tapered section of said reaction vessel;
   a first cylindrical section adjacent said tapered portion that has a diameter slightly smaller than the diameter of said wider mouth cylinder;
   a vessel matching section on said first cylindrical section with a diameter that matches the diameter of said wider mouth cylinder; and
   a lid section on said vessel matching section;
   so that excess pressure in said reaction vessel urges said plug to move in said mouth portion to allow gas to move past said tapered portion of said plug, past said first cylindrical section, and out of said vessel vent opening, while the vessel matching section of said plug maintains the wider mouth cylinder of said vessel closed.

4. A vessel system according to claim 3 wherein said frame defines a chamber for receiving said reaction vessel and in which one face of said frame defines a rectangular opening into which said reaction vessel and reinforcing sleeve can be inserted; and the opposite face of said frame defines a smaller rectangular opening that is smaller than the diameter of said reaction vessel and sleeve to thereby help seat said reaction vessel and said sleeve in said frame.

5. A vessel system according to claim 4 wherein said complementary keying structure elements comprise:

an outer ring on the outside of said reaction vessel at a position corresponding to said inner face mouth cylinder segment; and a pair of keying notches in said outer ring that engage opposing sides of said smaller rectangular opening in said frame.

6. A vessel system according to claim 5 wherein said frame includes a vent tube that is aligned with said radially extending pressure vent opening in said reaction vessel so that gases released through said radially extending vent opening in said reaction vessel are directed through said vent tube in said frame.

7. A vessel system according to claim 3 wherein said dimensionally stable closure includes a depending annular ring that surrounds both said lid section of said sliding closure plug and upper portions of said mouth cylinder segment of said reaction vessel.

8. A vessel system according to claim 1 wherein said reinforcing sleeve surrounds at least said tapered segment of said interface of said reaction vessel.

* * * * *